United States Patent [19]
Czesak

[11] Patent Number: 6,105,800
[45] Date of Patent: *Aug. 22, 2000

[54] BLOWN PLASTIC CONTAINERS WITH THREADS

[75] Inventor: Theodore M. Czesak, Perrysburg, Ohio

[73] Assignee: Owens-Brockway Plastic Products Inc., Toledo, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/948,923

[22] Filed: Oct. 10, 1997

[51] Int. Cl.[7] ............................... B65D 1/02; B65D 1/46
[52] U.S. Cl. ............................... 215/42; 215/43; 215/44; 215/321; 220/288
[58] Field of Search ............................... 215/40, 42, 44, 215/321; 220/288, 659

[56] References Cited

U.S. PATENT DOCUMENTS

| | | | |
|---|---|---|---|
| D. 211,509 | 6/1968 | Vanderhyde | D9/92 |
| D. 219,129 | 11/1970 | Wood | D9/92 |
| D. 269,763 | 7/1983 | Fortuna | D9/398 |
| 2,335,260 | 11/1943 | Chamberlain | 220/676 |
| 3,015,404 | 1/1962 | Wuyckens | 215/42 |
| 3,499,567 | 3/1970 | Spotts | 215/42 |
| 3,618,802 | 11/1971 | Yates, Jr. | 215/321 |
| 3,682,345 | 8/1972 | Baugh | 215/43 |
| 3,707,241 | 12/1972 | Taylor . | |
| 3,784,040 | 1/1974 | Douglas | 215/42 |
| 3,915,330 | 10/1975 | Hammes et al. | 220/659 |
| 3,973,941 | 8/1976 | Augeri | 215/44 X |
| 3,998,355 | 12/1976 | Galer | 220/288 X |
| 4,014,452 | 3/1977 | Galer | 220/659 |
| 4,098,419 | 7/1978 | Virog, Jr. et al. | 215/44 X |
| 4,293,080 | 10/1981 | Letica | 220/659 X |
| 4,429,805 | 2/1984 | Letica . | |
| 4,649,068 | 3/1987 | Collette | 215/42 X |
| 4,699,285 | 10/1987 | Perne et al. | 215/44 X |
| 4,755,342 | 7/1988 | Biermann | 215/44 X |
| 4,852,752 | 8/1989 | Ota | 215/44 |
| 5,217,128 | 6/1993 | Stenger | 220/669 X |
| 5,503,886 | 4/1996 | Guarriello et al. | 215/42 X |
| 5,678,711 | 10/1997 | Tobias | 215/42 |

FOREIGN PATENT DOCUMENTS

| | | | |
|---|---|---|---|
| 234024 | 6/1964 | Austria | 215/43 |
| 0 136 222 A2 | 4/1985 | European Pat. Off. . | |
| 0729891 | 9/1996 | European Pat. Off. . | |
| 11-100018 | 4/1999 | Japan . | |

OTHER PUBLICATIONS

1. Two photographs of prior art white container finish. Effective date as prior art unknown.
2. Two photographs of prior art yellow container finish. Effective date as prior art unknown.
3. Two photographs of prior art white container finish. Effective date as prior art unknown.
4. Two photographs of prior art yellow container finish. Effective date as prior art unknown.
5. Two photographs of prior art milk container finish. Effective date as prior art unknown.

*Primary Examiner*—Sue A. Weaver

[57] ABSTRACT

A blown plastic container that includes a hollow plastic body, an integral blow-molded neck and an integral blow-molded finish with a radially outwardly extending blow-molded thread or bead for retaining a closure on the finish. Reinforcement is provided between the thread or bead and a ledge on the finish to prevent collapse of the finish when a closure is applied to the finish. In one form, this reinforcement includes blow-molded axial columns extending radially outwardly. In another form, the reinforcement includes geometric depressions. Preferably, the reinforcement is disposed circumferentially at equal spacing. When the container is trimmed, the finish may have an annular frusto-conical radial ledge spaced form the open end of the finish. The reinforcement extends between the ledge and the lowest thread or bead, between the thread or bead, or for the full height of the finish above the ledge.

20 Claims, 5 Drawing Sheets

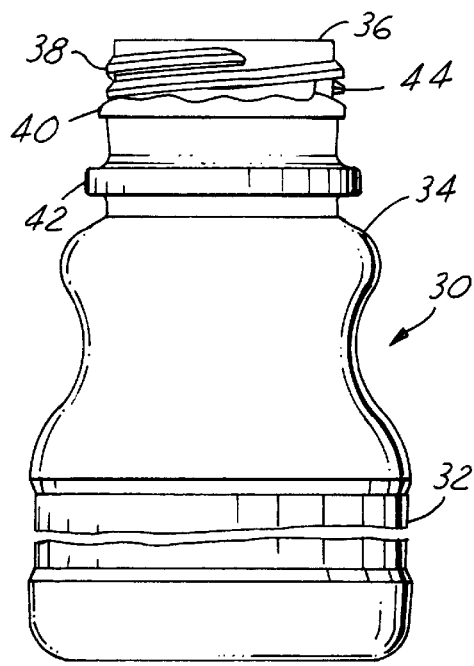
FIG. 1
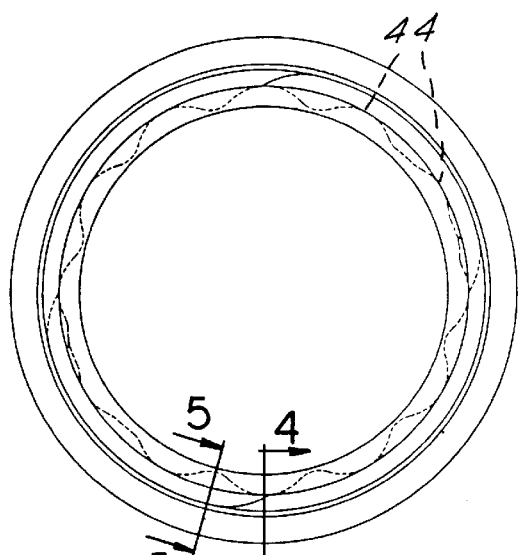
FIG. 3
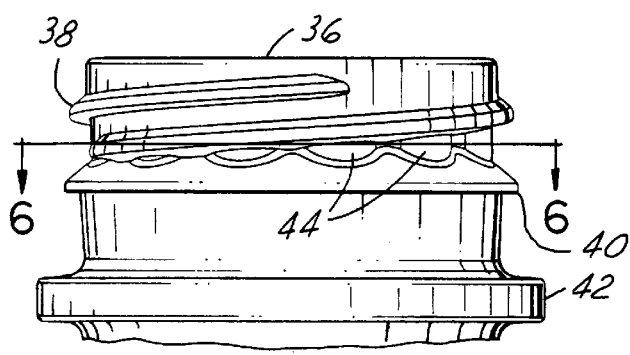
FIG. 2
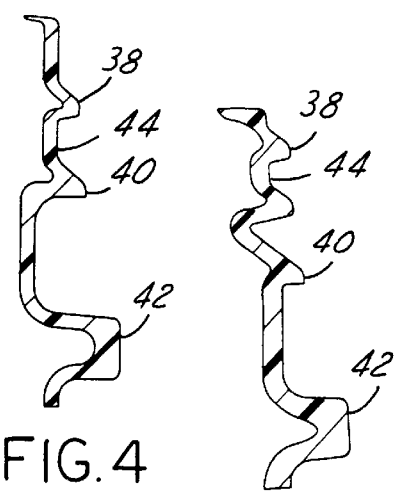
FIG. 4
FIG. 5
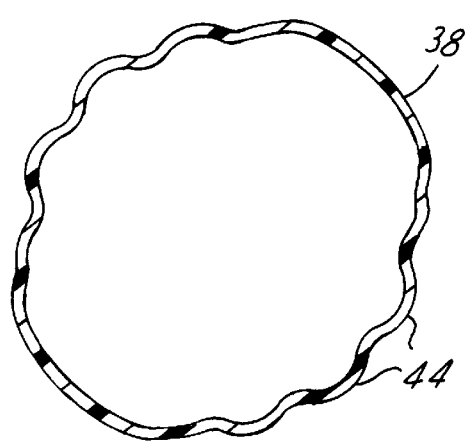
FIG. 6

BLOWN PLASTIC CONTAINERS WITH THREADS

This invention relates to blown plastic containers and particularly to blown plastic containers that include a finish which has threads formed thereon.

BACKGROUND AND SUMMARY OF THE INVENTION

In blown plastic containers made by an extrusion blow molding process, it is common to form retention means on the finish by blow molding. Such retention means may comprise threads on the finish for engagement with threads on a closure. Where the retention means comprises a blow molded bead on the container, the compressive axial force of application of a closure by closure application machinery can collapse the finish. This may also occur where a container is made into a plastic tube by cutting off the base of the container after application of the closure. The axial force of application of the force coupled with the flexibility of the side wall of the container may result in inadequate retention of the closure. As a result, the desired off torque force is not maintained. It has been found that where the finish includes blown threads, when a closure is applied by closure application machinery, the controlled applied torque force collapses the finish and strips the closure off the finish. This occurs where the selected container finish and closure may not be fully compatible, that is, the threads and closures are imperfectly matched.

Among the objectives of the present invention are to provide a blown plastic container where the finish is sufficiently strong that it will not collapse when a closure is torqued or pressed onto a filled or unfilled container; where the closure will not readily strip off when being applied and the desired off torque will be maintained; and to provide a method of forming the finish to achieve such a result.

In accordance with the invention, the blown plastic container includes a hollow plastic body, an integral blow molded neck and an integral blow molded finish with a radially outwardly extending blow molded retention means such as thread or bead on the finish. In one form, the reinforcing means comprises blow molded axial columns extending radially outwardly. In another form, the reinforcing means comprises geometric depressions. Preferably, the reinforcing means are disposed circumferentially at equal spacing. When the extrusion blow molded container is trimmed, the finish may have an annular frustoconical radial ledge spaced from the open end of the finish. The projection means may extend between the ledge and the lowest mold threads or beads; between the threads or beads or for the full height of the finish above the ledge.

DESCRIPTION OF THE DRAWINGS

FIG. 1 is an elevational view of an extrusion blow molded container embodying the invention.

FIG. 2 is a fragmentary enlarged elevational view of the finish on the container shown in FIG. 1.

FIG. 3 is a top plan view of the finish shown in FIG. 2.

FIG 4 is a sectional view taken along the line 4—4 in FIG. 3.

FIG. 5 is a sectional view on an enlarged scale taken along the line 5—5 in FIG. 3.

FIG. 6 is a sectional view taken along the line 6—6 in FIG. 2.

DETAILED DESCRIPTION OF THE PREFERRED EMBODIMENTS

Figure 7:
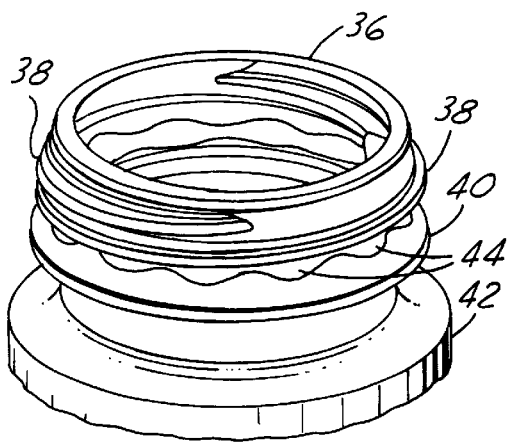
FIG. 7 is a fragmentary perspective view of the finish.
Figure 8:
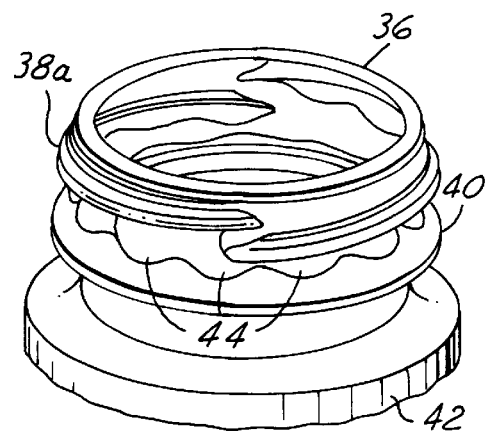
FIG. 8 is a fragmentary perspective view of a modified form of finish.
Figure 9:
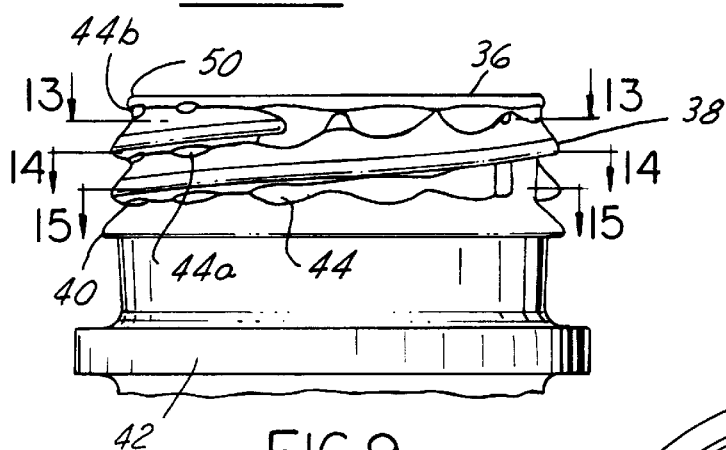
FIG. 9 is a fragmentary enlarged elevational view of another modified form of a finish of a blown container embodying the invention.
Figures 11, 12:
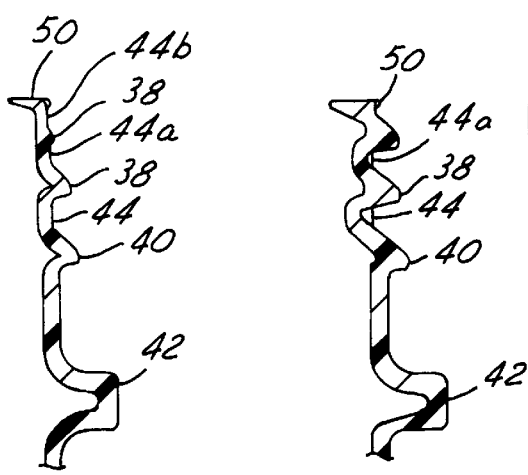
FIG. 11 is a sectional view taken along the line 11—11 in FIG. 10.
FIG. 12 is a sectional view taken along the line 12—12 in FIG. 10.
Figure 10:
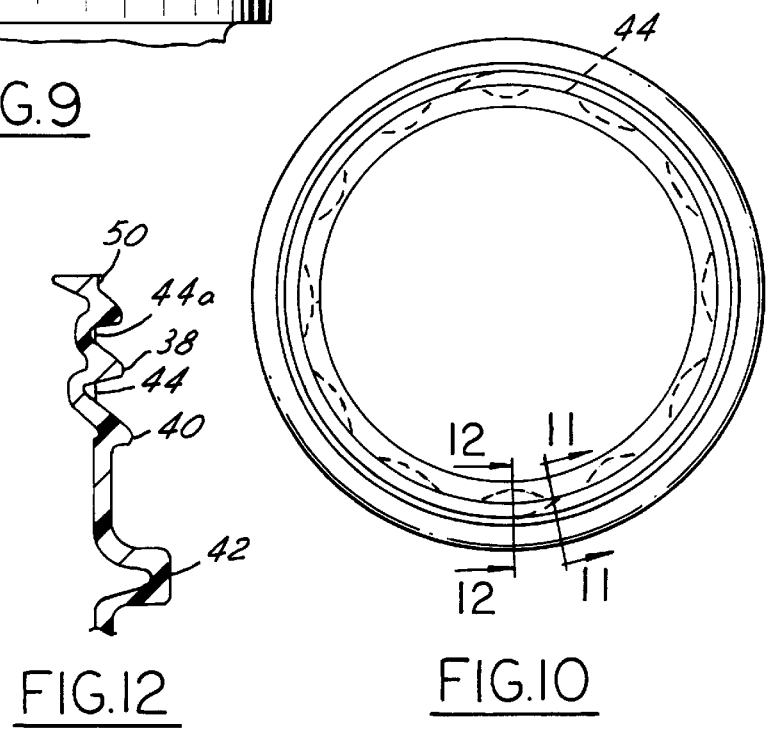
FIG. 10 is a top plan view of the finish shown in FIG. 9.
Figure 13:
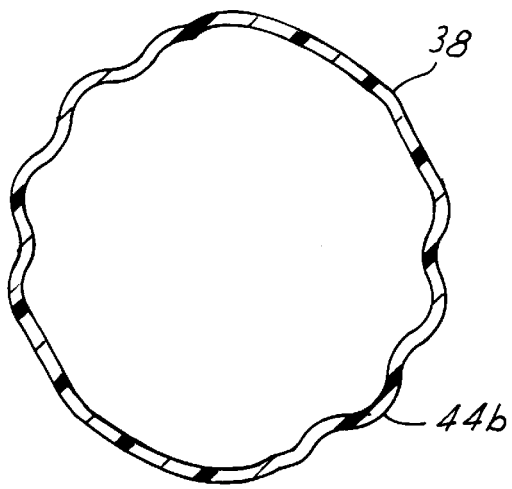
FIG. 13 is a sectional view taken along the line 13—13 in FIG. 9.
Figure 14:
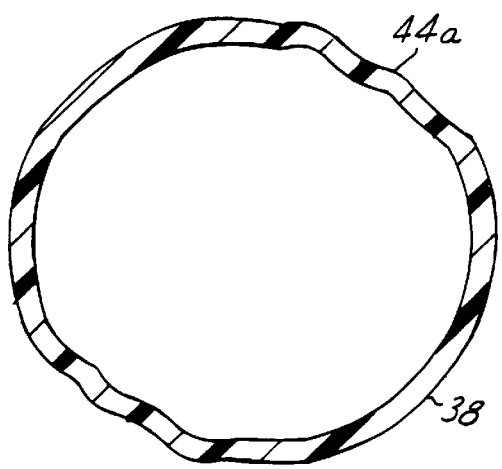
FIG. 14 is a sectional view taken along the line 14—14 in FIG. 9
Figure 15:
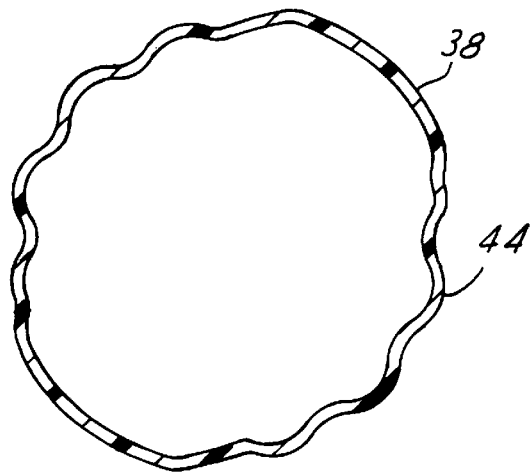
FIG. 15 is a sectional view taken along the line 15—15 in FIG. 9
Figure 16:
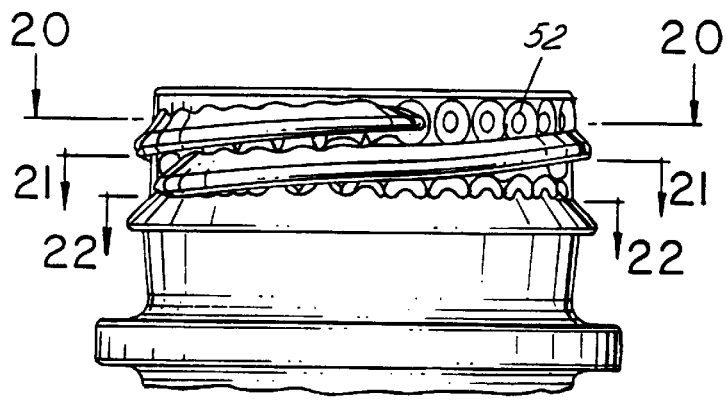
FIG. 16 is a fragmentary enlarged elevational view of another modified form of finish of a container embodying the invention.
Figure 17:
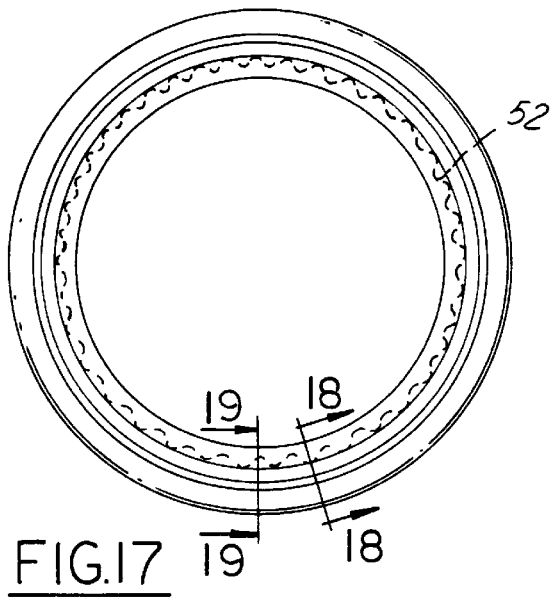
FIG. 17 is a top plan view of the finish shown in FIG. 16.
Figures 18, 19:
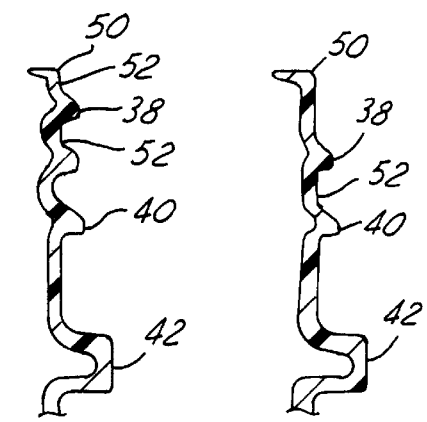
FIG. 18 is a sectional view taken along the line 18—18 in FIG. 17.
FIG. 19 is a sectional view taken along the line 19—19 in FIG. 17.
Figure 20:
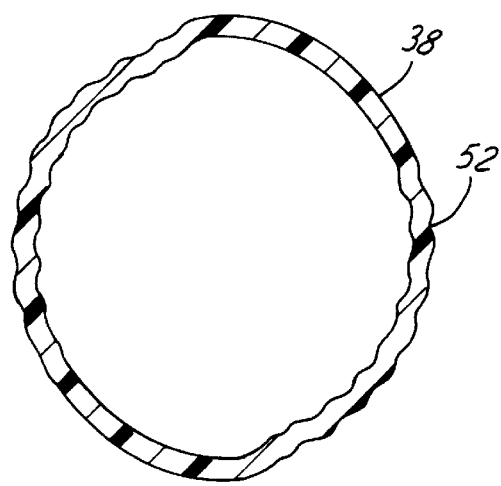
FIG. 20 is a sectional view taken along the line 20—20 in FIG. 16.
Figure 21:
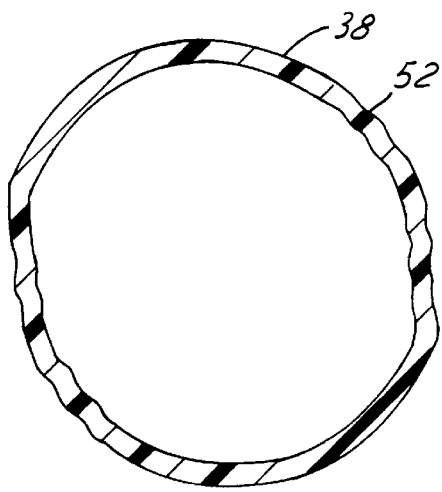
FIG. 21 is a sectional view taken along the line 21—21 in FIG. 16.
Figure 22:
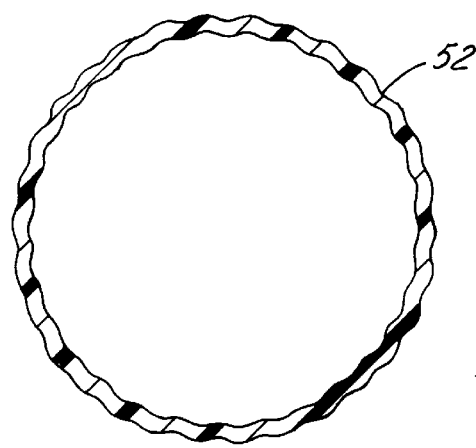
FIG. 22 is a sectional view taken along the line 22—22 in FIG. 16.
Figure 23:
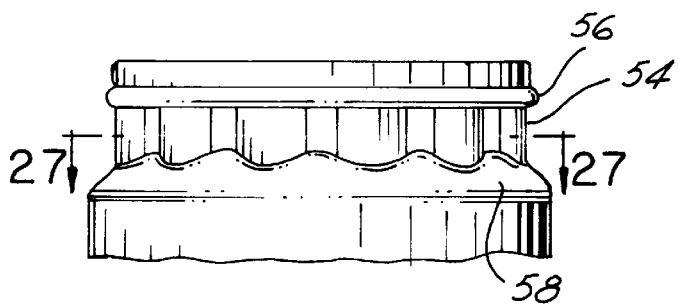
FIG. 23 is a fragmentary elevational view of another modified form of finish of a container embodying the invention.
Figure 24:
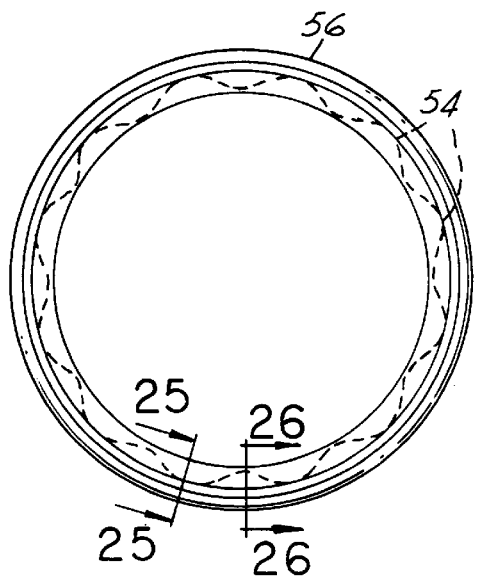
FIG. 24 is a top plan view of the finish shown in FIG. 23.
Figure 25:
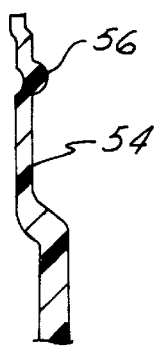
FIG. 25 is a sectional view taken along the line 25—25 in FIG. 24.
Figure 26:
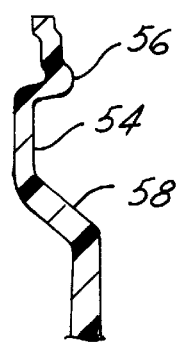
FIG. 26 is a sectional view taken along the line 26—26 in FIG. 24.
Figure 27:
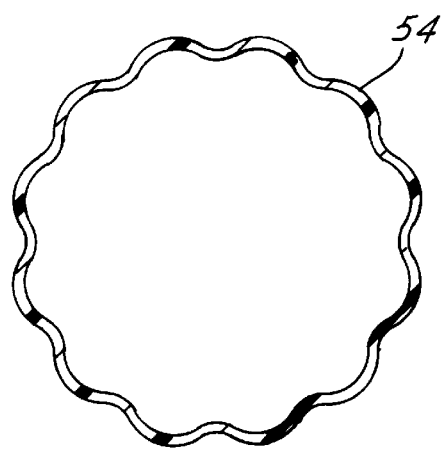
FIG. 27 is a sectional view taken along the line 27—27 in FIG. 23.

Referring to FIG. 1, in accordance with the invention, a blow molded plastic container 30 is made by extrusion blow molding wherein a parison is extruded, blow molds closed about the parison and the parison is blown to the confines of the cavity of a mold to form a blow molded container and a blow molded finish. The container 30 includes a hollow plastic body 32, an integral blow molded shoulder 34 and an integral blow molded finish 36 with a radially outwardly extending thread 38 on the finish 36. The thread 38 may be a single threaded or a multiple thread herein shown as a double thread. The thread preferably includes an extra quarter turn as shown in FIG. 7 but the thread 38a can be an 180 degree thread as shown in FIG. 8. The container also preferably includes an integral blow molded ledge 40 and an integral blow molded handling bead 42. However, the ledge 40 and handling bead 42 may be omitted.

In accordance with the invention, the finish 36 has integrally blow molded reinforcing means thereon. In the form shown, the reinforcing means comprises blow molded axial columns 44 which extend radially outwardly between the lowermost portion of threads 38 and ledge 40 (FIG. 2). Preferably, the columns 44 are disposed circumferentially at equal spacing as shown in FIG. 3. As shown in FIGS. 3–5, finish 38, including columns 44, is of generally uniform radial thickness.

In the modified form of the invention shown in FIGS. 9–15, the reinforcing means comprises axially extending blow molded columns 44, 44a between the threads and columns 44b between the top thread portion and an annular rib 50 which extends radially outwardly.

In the modified form of the invention shown in FIGS. 16–22, the reinforcing means comprises blow molded means 52 comprise blow molded circular indentations but may comprise any geometric shape which provide structural strength such as squares, rectangles, rounds, ovals, triangles, diagonal ribs herein shown having a curves cross section.

In the modified form shown in FIGS. 23–27, the blow molded reinforcing means 54 comprise columns which extend between retention means in the form of a blow molded retention bead 56 and the shoulder 58 of the container.

It can thus be seen that there has been provided a blown plastic container where the finish is sufficiently strong that it will not collapse when a closure is torqued or pressed onto a filled or unfilled container. The closure will not readily strip off when being applied and the desired off torque will be maintained; and to provide a method of forming the finish to achieve such a result.

I claim:

1. A container finish of one-piece integrally blow-molded plastic construction with retention means extending circumferentially around said finish for retaining a closure on said finish, said finish including said retention means being of generally uniform radial wall thickness, a circumferentially extending radially outwardly projecting ledge axially spaced from said retention means, and reinforcing means, also of said generally uniform radial wall thickness, extending axially from said retention means to said ledge, contiguous with said retention means and said ledge, and circumferentially around said finish between said retention means and said ledge so as to impart a continuously undulating cross section to said finish in a plane lateral to said finish between said retention means and said ledge for strengthening the container finish against collapse as a closure is applied to the finish.

2. The container finish set forth in claim 1 wherein said reinforcing means has a lesser radial dimension than said retention means so as not to interfere with application of a closure to said retention means.

3. The container finish set forth in claim 1 wherein said retention means comprises at least one thread.

4. The container finish set forth in claim 3 wherein said at least one thread comprises a single thread extending more than 360 degrees around said finish and said reinforcing means extend between overlapped ends of said single thread.

5. The container finish set forth in claim 4 wherein said at least one thread comprises multiple threads and said reinforcing means extend between said multiple threads.

6. The container finish set forth in claim 1 wherein said reinforcing means comprises integral molded axial columns extending radially outwardly and axially along said finish.

7. The container finish set forth in claim 1 wherein said reinforcing means comprises molded geometric portions on said finish.

8. The container finish set forth in claim 1 wherein said reinforcing means comprise depressions.

9. The container finish set forth in claim 1 wherein said retention means comprise a retention bead.

10. The container finish set forth in claim 1 where said finish is blow molded with a hollow body forming a one-piece container.

11. A hollow plastic container that comprises:

a hollow blow-molded container body, and a container finish integrally blow-molded as one piece with said container body with retention means extending circumferentially around said finish for retaining a closure on said finish, said finish including said retention means being of generally uniform radial thickness, a circumferentially extending radially outwardly projecting ledge axially spaced from said retention means, and reinforcing means, also of said generally uniform radial wall thickness, extending axially from said retention means to said ledge, contiguous with said retention means and said ledge, and circumferentially around said finish between said retention means and said ledge so as to impart a continuously undulating cross section to said finish in a plane lateral to said finish between said retention means and said ledge for strengthening the container finish against collapse as a closure is applied to the finish.

12. The plastic container set forth in claim 11 wherein said reinforcing means comprises blow molded geometric portions on said finish.

13. The plastic container set forth in claim 12 wherein said retention means comprises at least one thread.

14. The plastic container set forth in claim 13 wherein said reinforcing means comprises integral blow molded axial columns extending radially outwardly.

15. The plastic container set forth in claim 14 wherein said thread comprises a single thread having overlapped ends and said columns extend between said ends.

16. The plastic container set forth in claim 14 wherein said at least one thread comprises multiple threads and said columns extend between said multiple threads.

17. The plastic container set forth in claim 12 wherein said reinforcing means comprise depressions.

18. The plastic container set forth in claim 17 wherein said retention means comprise at least one thread and said blow molded depressions extend between thread portions.

19. The plastic container set forth in claim 17 wherein retention means comprises blow molded multiple threads and said blow molded depressions extend between said multiple threads.

20. The plastic container set forth claim 12 wherein said retention means comprises a retention bead.

* * * * *